United States Patent
Jung et al.

(10) Patent No.: US 11,080,027 B2
(45) Date of Patent: Aug. 3, 2021

(54) CURATED IMAGE MANAGEMENT IN A FAAS INFRASTRUCTURE

(71) Applicant: VMware, Inc., Palo Alto, CA (US)

(72) Inventors: Berndt Jung, Redwood City, CA (US); Mark Peek, Belmont, CA (US); Nicholas Tenczar, San Francisco, CA (US); Ivan Mikushin, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/244,784

(22) Filed: Jan. 10, 2019

(65) Prior Publication Data

US 2020/0225917 A1 Jul. 16, 2020

(51) Int. Cl.
*G06F 8/36* (2018.01)
*G06F 9/455* (2018.01)
*G06F 8/61* (2018.01)

(52) U.S. Cl.
CPC .......... *G06F 8/36* (2013.01); *G06F 8/63* (2013.01); *G06F 9/45558* (2013.01); *G06F 2009/45579* (2013.01); *G06F 2009/45595* (2013.01)

(58) Field of Classification Search
CPC .......... G06F 8/36; G06F 8/63; G06F 9/45558; G06F 2009/45579; G06F 2009/45595
USPC .......................................................... 717/120
See application file for complete search history.

(56) References Cited

U.S. PATENT DOCUMENTS

| | | | | |
|---|---|---|---|---|
| 8,627,311 | B2* | 1/2014 | Auer | G06F 8/61 |
| | | | | 717/176 |
| 9,841,953 | B2* | 12/2017 | Laskey | G06F 8/31 |
| 10,742,750 | B2* | 8/2020 | Johnson, II | H04L 45/306 |
| 10,860,394 | B2* | 12/2020 | Bagade | G06F 9/546 |
| 2012/0110546 | A1* | 5/2012 | Jo | G06F 8/36 |
| | | | | 717/107 |
| 2012/0198438 | A1* | 8/2012 | Auer | G06F 8/61 |
| | | | | 717/176 |
| 2017/0052764 | A1* | 2/2017 | Laskey | G06F 8/31 |
| 2017/0177310 | A1* | 6/2017 | Mathias | G06F 8/71 |
| 2018/0107459 | A1* | 4/2018 | Duggal | G06F 8/36 |
| 2019/0028552 | A1* | 1/2019 | Johnson, II | H04L 45/306 |

(Continued)

OTHER PUBLICATIONS

Moreno, "Creating Custom Containers with Generative Techniques", [Online], 2006, pp. 29-38, [Retrieved from internet on Mar. 23, 2021], <https://dl.acm.org/doi/pdf/10.1145/1173706.1173712> (Year: 2006).*

(Continued)

*Primary Examiner* — S. Sough
*Assistant Examiner* — Zengpu Wei

(57) ABSTRACT

Techniques for implementing curated image management in a Functions-as-a-Service (FaaS) infrastructure are provided. In one set of embodiments, a service component of the FaaS infrastructure can maintain one or more curated software lists defined by one or more administrators of the FaaS infrastructure, where the one or more curated software lists identify software that has been approved for use on the FaaS infrastructure. The service component can further receive, from an application developer, a selection of software from the one or more curated software lists, generate a custom image that incorporates the received selection of software, and store the custom image in a repository of the FaaS infrastructure.

18 Claims, 4 Drawing Sheets

(56) References Cited

U.S. PATENT DOCUMENTS

| | | | | |
|---|---|---|---|---|
| 2019/0075154 A1* | 3/2019 | Zhang | ................. | H04L 41/147 |
| 2019/0089602 A1* | 3/2019 | Bagade | ................. | H04L 67/12 |
| 2019/0377604 A1* | 12/2019 | Cybulski | ............... | G06F 9/5044 |
| 2020/0097138 A1* | 3/2020 | Jacobson | ................. | G06F 8/38 |

OTHER PUBLICATIONS

Vukobratovic et al, "Network Function Computation as a Service in Future 5G Machine Type Communications", [Online], 2016, pp. 365-369, [Retrieved from internet on Mar. 24, 2021], <https://ieeexplore.ieee.org/stamp/stamp.jsp?tp=&arnumber=7593138> (Year: 2016).*

Fox et al, "Serverless Computing (WoSC) 2017 Report from workshop and panel on the Status of Serverless Computing and Function-as-a-Service in Industry and Research", [Online], 2017, pp. 1-22, [Retrieved from internet on Mar. 24, 2021], <https://arxiv.org/ftp/arxiv/papers/1708/1708.08028.pdf> (Year: 2017).*

* cited by examiner

CURATED IMAGE MANAGEMENT IN A FAAS INFRASTRUCTURE

BACKGROUND

Functions-as-a-service (FaaS) is a computing model in which application developers upload modular chunks of application functionality (referred to as functions) to a cloud-based FaaS infrastructure. Once uploaded, a service layer of the FaaS infrastructure schedules and executes the functions on-demand (e.g., at the time of function invocation) on servers (i.e., hosts) of the infrastructure in an independent and scalable manner. Examples of well-known public cloud-based FaaS infrastructures include Amazon AWS Lambda, Microsoft Azure Functions, and Google Cloud Functions.

In current FaaS implementations, when an application developer wishes to upload a function, the developer creates and submits a function artifact that includes (1) the program code for the function and (2) software dependencies such as application-level libraries, packages, etc. that are needed to run the function. Upon receiving the function artifact, the FaaS infrastructure typically layers the contents of the function artifact onto a "base image," which includes system-level software (e.g., operating system (OS) libraries, drivers, language runtime, etc.) required by the infrastructure's OS platform. The combination of the function artifact with the base image results in a "function runtime image" that can be run on the infrastructure's hosts to execute the function.

One shortcoming with the conventional upload process described above is that it can be burdensome and time-consuming for application developers to identify and include all of the dependencies that are needed for their functions in the respective function artifacts. This is particularly true if the functions have a large number of dependencies and/or if a developer needs to upload a large number of functions. Some FaaS infrastructures impose a limit on the maximum size of a function artifact, which further complicates the upload process and may require re-engineering of a function's code in order to reduce its dependencies.

Another shortcoming is that the administrators of a FaaS infrastructure generally do not have visibility into the software that is uploaded to and run on their hosts via the uploaded function artifacts. The function runtime images that are created via these artifacts are essentially black boxes to the administrators. As a result, it is possible that some developers may upload vulnerable or malicious code as part of their function artifacts that go undetected and ultimately compromise the security of the infrastructure.

SUMMARY

Techniques for implementing curated image management in a Functions-as-a-Service (FaaS) infrastructure are provided. In one set of embodiments, a service component of the FaaS infrastructure can maintain one or more curated software lists defined by one or more administrators of the FaaS infrastructure, where the one or more curated software lists identify software that has been approved for use on the FaaS infrastructure. The service component can further receive, from an application developer, a selection of software from the one or more curated software lists, generate a custom image that incorporates the received selection of software, and store the custom image in a repository of the FaaS infrastructure.

The following detailed description and accompanying drawings provide a better understanding of the nature and advantages of particular embodiments.

DETAILED DESCRIPTION

Figure 1:
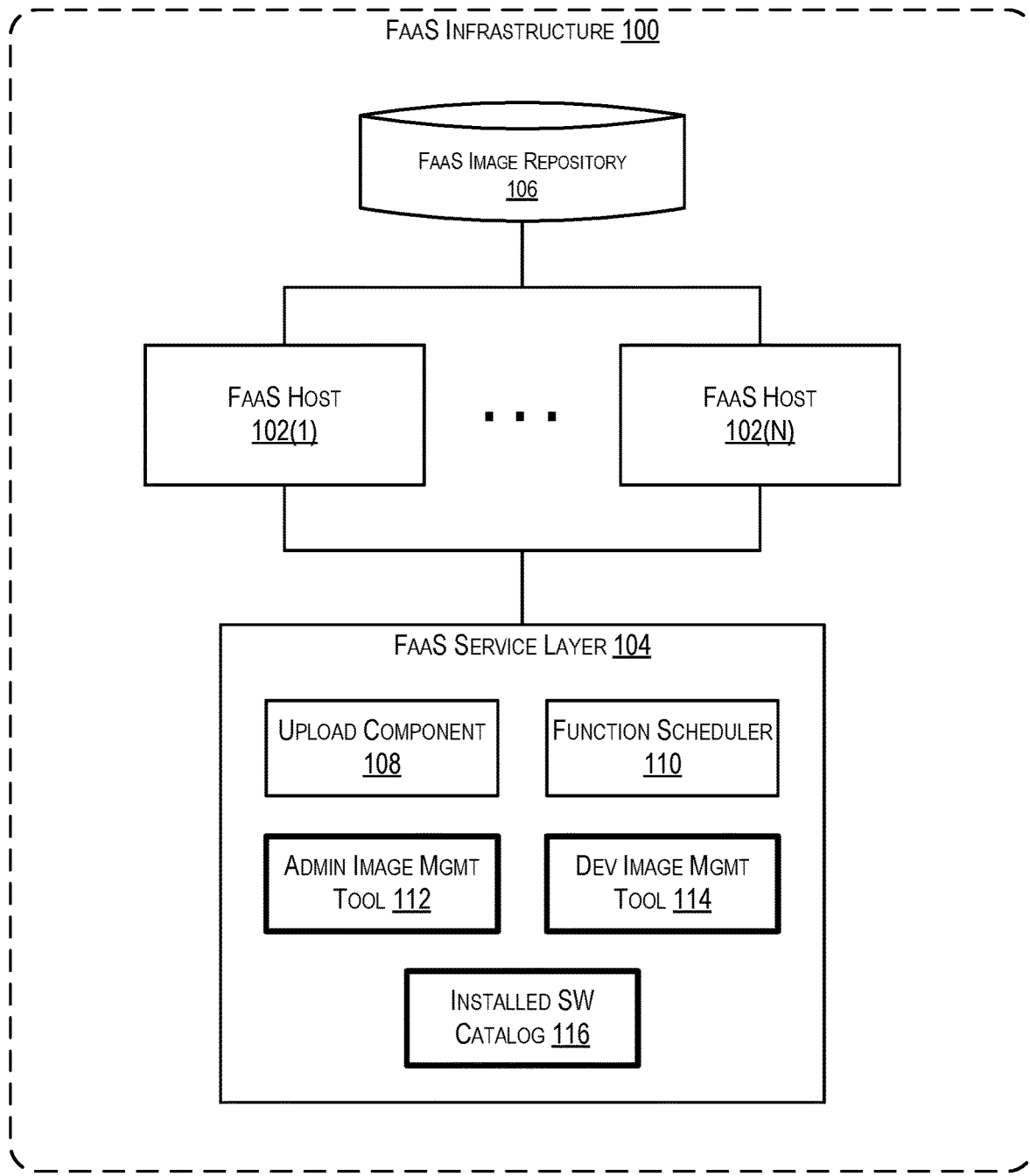
FIG. 1 depicts a FaaS infrastructure that implements the techniques of the present disclosure according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof

1. Overview

Embodiments of the present disclosure provide a framework for implementing curated image management in a FaaS infrastructure. According to one set of embodiments, the framework includes an admin-facing tool that enables an administrator of the FaaS infrastructure to define a curated set of base images and one or more curated lists of software (e.g., application-level packages or libraries) that have been vetted as being safe and appropriate for use/execution on the infrastructure.

The framework further includes a developer-facing tool that presents the curated base images and curated software lists to an application developer. Through this developer-facing tool, the application developer can build one or more "custom images" that each includes a selected base image from the set of curated base images and a selected subset of software from the curated software lists that correspond to dependencies for functions (or function types) which the developer is likely to upload. The application developer can then select an appropriate custom image at the time of uploading a function artifact for a given function F (e.g., a custom image that includes all of the dependencies of F) and the infrastructure can generate a function runtime image for F that incorporates the contents of the custom image.

With the general approach described above, the size and complexity of uploaded function artifacts can be significantly reduced because there is no need for application developers to include all function dependencies in the artifacts themselves. Instead, these dependencies can be selected and included in the custom images that are built via the developer-facing tool (which are ultimately combined with function artifacts to generate function runtime images). This means that each function artifact can simply comprise the code for a given function, thereby simplifying the upload process for the developer.

Additionally, since the custom images are based on the curated base images and curated software lists defined by the administrators of the FaaS infrastructure, the administrators have a measure of control over the software that is included/installed in each function runtime image. In certain embodiments, the FaaS infrastructure can maintain a catalog of all installed system and runtime dependencies for visibility, tracking, and other purposes.

The foregoing and other aspects of the present disclosure are described in further detail below. It should be noted that while the present disclosure specifically describes examples and embodiments that support curated image management for functions in a FaaS infrastructure, the same principles may also be applied to other types of computing models/infrastructures that are similar to, but not identical to, FaaS. For example, the techniques of the present disclosure may be used to implement curated image management for any type encapsulated (e.g., containerized, virtualized, etc.) workload.

2. FaaS Infrastructure

FIG. 1 depicts a simplified block diagram of a FaaS infrastructure 100 that implements the techniques of the present disclosure according to an embodiment. As shown, FaaS infrastructure 100 includes a plurality of FaaS hosts 102(1)-(N) that are communicatively coupled with a FaaS service layer 104 and a FaaS image repository 106. In various embodiments, FaaS infrastructure 100 may be a private cloud-based (i.e., on premise) or public cloud-based infrastructure.

In practice, application developers that wish to use FaaS infrastructure 100 can create and upload functions (in the form of function artifacts) to infrastructure 100 via an upload component 108 of FaaS service layer 104. Upload component 108 may be implemented as, e.g., a graphical user interface (GUI), a command-line interface (CLI), or an application programming interface (API). The functions that are uploaded via upload component 108 can correspond to modular portions of functionality in the developers' applications. For example, one such function may be designed to extract data from a file, another such function may be designed to process the extracted data in a certain way, and so on. In conventional implementations, each uploaded function artifact is combined with a base image to generate a function runtime image. The term "image" as used herein refers to any type of executable package or bundle of files, such as a container image, a virtual machine image, or the like. The function runtime images are then stored in FaaS image repository 106.

When an application that invokes an uploaded function is run, a function scheduler 110 of FaaS service layer 104 receives an invocation request for that function and selects one of FaaS hosts 102(1)-(N) for executing the function. Function scheduler 110 can make this selection based on various criteria such as system load, available network bandwidth, and the like. The selected FaaS host subsequently retrieves the function runtime image for the invoked function from FaaS image repository 106, loads/initializes the function runtime image in its primary memory (thereby creating an instance of the function), and executes the function instance.

As noted in the Background section, in existing FaaS implementations an application developer is required to include in an uploaded function artifact both the function code and software dependencies of the function. These software dependencies can comprise, e.g., application-level libraries, packages, tools, etc. that are not included in the base image provided by the FaaS infrastructure but are needed to execute the function. The problems with this requirement are twofold; first, it increases the size/complexity of the function artifact and makes the upload process burdensome and time-consuming for the application developer, since the developer must identify and include every dependency in the artifact. Second, it takes away control and visibility from the administrators of the FaaS infrastructure, because they cannot view and track what software dependencies are uploaded by developers as part of their function artifacts.

To address these and other similar issues, FaaS service layer 104 of FIG. 1 is enhanced to include an admin image management tool 112, a developer image management tool 114, and an installed software catalog 116. Components 112, 114, and 116 may be implemented in software, hardware, or a combination thereof. At a high level, admin image management tool 112 can enable the administrators of FaaS infrastructure 100 to create curated base images and one or more curated lists of software (comprising, e.g., names and versions) that have been vetted and approved by the administrators as being safe for use/execution on the hosts of infrastructure 100. The curated base images can include system-level libraries, drivers, and a language runtime that are specific to the OS platform of FaaS hosts 102(1)-(N). The curated lists of software can include application and/or system-level libraries, packages, frameworks, etc. that are common dependencies for functions that are uploaded to FaaS infrastructure 100.

By way of example, an administrator may create (1) a first base image B1 that includes system-level software and a language runtime for the Python programming language, (2) a second base image B2 that includes system-level software and a language runtime for the Java programming language, (3) a first list of curated software that is associated with base image B1 and comprises software components S1 (version 1.0), S2 (version 1.0), and S3 (version 1.5), and (3) a second list of curated software that is associated with base image B2 and comprises software components S4 (version 2.0) and S5 (version 1.1).

Once these curated base images and software lists have been created via admin image management tool 112, application developers can use developer image management tool 114 to build their own custom images based on the curated base images and curated software lists, thereby enabling the developers to capture/encapsulate the software dependencies that are needed by their functions in these custom images. For example, returning to the example above, an application developer may build (1) a first custom image C1 that includes curated base image B1 and dependencies S2 and S3 from the curated software list associated with B 1, and (2) a second custom image C2 that includes curated base image B2 and dependencies S4 and S5 from the curated software list associated with B2.

Then, at the time of uploading a function artifact for a given function F via upload component 108, the application developer can simply include the code for function F in the artifact and select a previously created custom image that incorporates the appropriate base image and software dependencies for the function. For example, assuming function F is written in Java and requires S4 and S5 to run, the developer can select previously created custom image C2. In response to this selection, upload component 108 can generate a function runtime image for function F that includes the content of B2, S4, and S5 from custom image C2, thereby ensuring that the generated function runtime image encapsulates all of the dependencies needed to execute function F. Additionally, upload component 108 can create a mapping between the function runtime image and the various curated software components included in the function runtime image (e.g., S4, S5, etc.) and store this mapping in installed software catalog 116.

With the foregoing approach, a number of advantages are realized over existing FaaS implementations. First, there is no need for application developers to go through the arduous task of identifying and packaging software dependencies for their functions in each function artifact. Instead, the developers can define a relatively small number of custom images comprising sets of dependencies commonly required by their functions, and can apply these custom images as needed during the function upload process. The function artifacts themselves can be pared down to simply including the code for a given function (typically a single file). This is particularly useful if an application developer needs to upload a large number of functions that share the same or similar dependencies, since the developer can reuse the same custom image for each function upload.

Second, by defining the set of curated base images and curated software lists that developers may choose from to build their custom images, the administrators of FaaS infrastructure 100 can control what software gets installed on the function runtime images that are executed on the infrastructure. This significantly reduces or eliminates the risks involved in allowing developers to upload arbitrary software.

Third, through installed software catalog 116, the administrators can easily keep track of which software components are installed on which function runtime images of the infrastructure, which can useful for reporting, security auditing, software patching, and other purposes. For instance, if a given software library needs to be patched due to a newly discovered security vulnerability, the administrators can leverage installed software catalog 116 to identify the function runtime images in FaaS image repository 106 that have the software library installed and can rebuild those images with the patched version of the library.

Workflows for implementing the various processes described above are presented in the sections that follow. It should be appreciated that the diagram of FIG. 1 is illustrative and not intended to limit embodiments of the present disclosure. For example, although FIG. 1 depicts a particular arrangement of entities/components in FaaS infrastructure 100, other arrangements or configurations are possible depending on the specific deployment. Further, the various entities/components shown may have subcomponents or functions that are not specifically described. One of ordinary skill in the art will recognize other variations, modifications, and alternatives.

3. Creating/Defining Curated Base Images and Curated Software Lists

Figure 2:
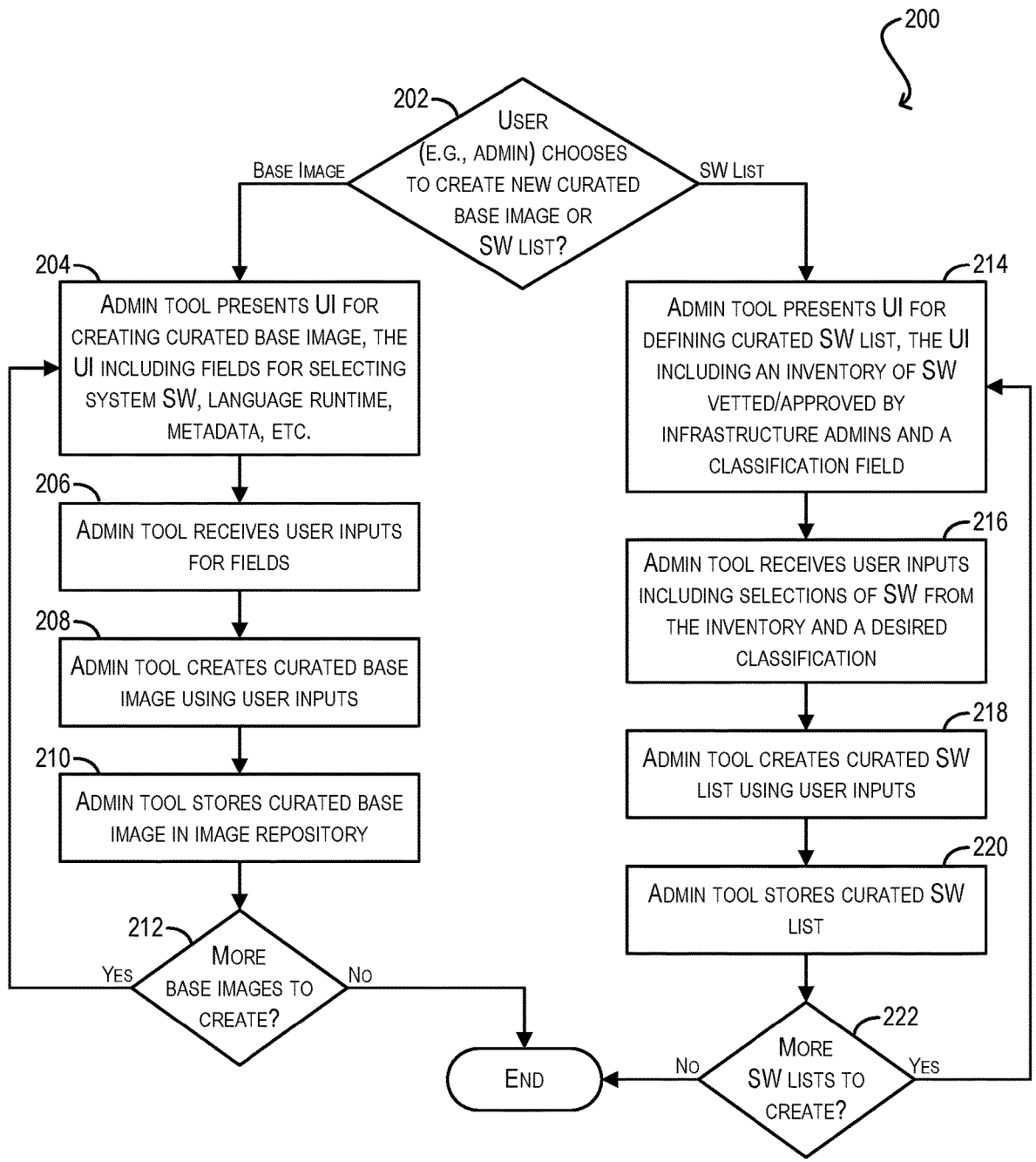
FIG. 2 depicts a workflow for creating/defining curated base images and curated software lists according to an embodiment.

FIG. 2 depicts a workflow 200 that may be executed by admin image management tool 112 of FIG. 1 for enabling the creation/definition of curated base images and curated software lists according to an embodiment. For purposes of illustration, FIG. 2 assumes that admin image management tool 112 is implemented as a self-service GUI-based application (such as a web or mobile application). However, the functionality of tool 112 also be provided in the form of a CLI, a programmatic API, or some other interface in alternative embodiments. Further, although FIG. 2 depicts the steps of workflow 200 according to a particular sequence, the order of these steps may be changed or transposed in alternative embodiments.

Starting with block 202 of workflow 200, a user of admin management tool 112 (i.e., an administrator of FaaS infrastructure 100) can choose to create/define a new curated base image or a new curated software list. If the user chooses the creation of a new curated base image, admin management tool 112 can present a first UI to the user for creating the base image (block 204). As mentioned previously, a base image is an image (i.e., executable package of files) that includes various pieces of system-level software that may be used by the system platform of FaaS infrastructure 100 and a language runtime. Thus, the UI presented at block 204 can include fields for selecting the system-level software to include in the base image (if any are optional), a field for selecting a language runtime, and so on. The UI can also include metadata fields such as base image name, constraints on which developers/functions/applications may use the base image, etc.

At blocks 206, 208 and 210, admin management tool 112 can receive inputs from the user filling in the fields of the UI, create the curated base image based on the user inputs, and store the curated base image in FaaS image repository 106. In addition, if there are further curated base images to be created by the user (block 212), tool 112 can return to block 202. Otherwise, the workflow can end.

Returning now to decision block 202, if the user chooses to define a new curated software list, admin management tool 112 can present a second UI for this purpose (block 214). In various embodiments, the UI presented at block 214 can include an inventory of all of the software (i.e., names and versions) that has been approved/vetted by the administrators of FaaS infrastructure 100 for use/installation thereon, as well as a classification field for associating the curated software list with a particular entity (e.g., a curated base image, an application, etc.).

At block 216, admin management tool 112 can receive inputs from the user including a selection of one or more of the software entries in the presented inventory and a desired classification. Admin management tool 112 can then create the curated software list based on the user inputs (block 218) and store the list in an appropriate location (block 220). In addition, if there are further curated software lists to be defined by the user (block 222), tool 112 can return to block 214. If there are no further lists to be defined the workflow can end.

4. Creating Custom Images

Figure 3:
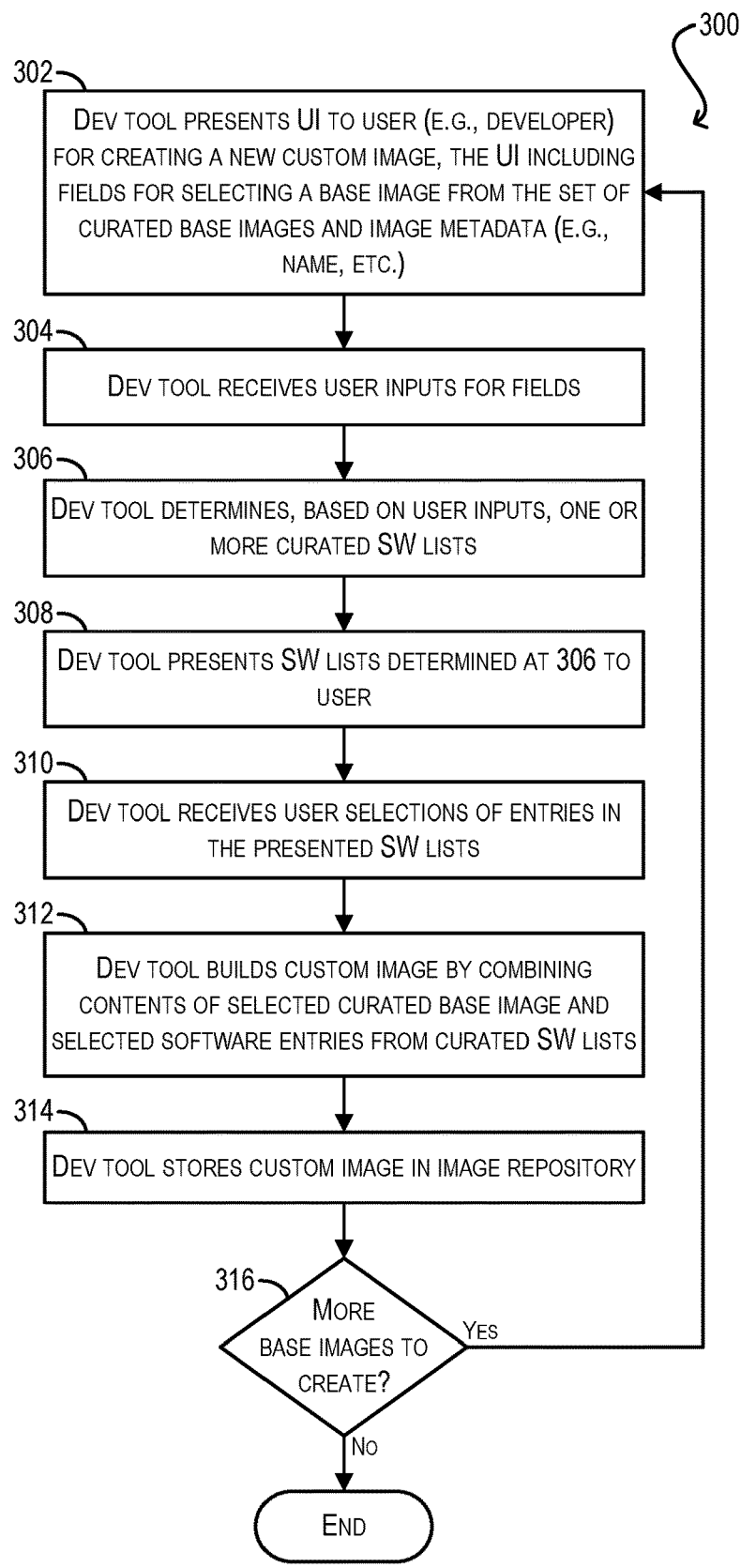
FIG. 3 depicts a workflow for creating custom images according to an embodiment

FIG. 3 depicts a workflow 300 that may be executed by developer image management tool 114 of FIG. 1 for enabling the creation of custom images according to an embodiment. Like workflow 200 of FIG. 2, workflow 300 assumes that developer image management tool 114 is implemented as a self-service GUI-based application. Workflow 300 also assumes that one or more curated base images and one or more curated software lists have already been created using admin image management tool 112 per workflow 200.

At block 302, developer image management tool 114 can present a UI to a user (e.g., an application developer) for creating a new custom image. As part of this step, developer image management tool 114 can present fields for selecting a base image for the custom image and entering various types of metadata associated with the custom image (e.g., custom image name, associated application, developer name/ID, etc.). The possible choices for the base image can be constrained to the set of curated base images created via admin image management tool 112 (or a subset thereof).

At blocks 304 and 306, developer image management tool 114 can receive inputs from the user pertaining to the fields presented at block 302 and can determine, based on the user inputs, one or more curated software lists that are relevant to or appropriate for this custom image. In a particular embodiment, the determination at block 306 can be made by looking at the curated base image selected by the user for this custom image and identifying all of the administrator-defined curated software lists that are associated with the selected base image.

At block 308, developer image management tool 114 can present within the UI the one or more curated software lists determined at block 306. In response, tool 114 can receive selections of one or more of the entries in the presented lists from the user (block 310).

Finally, at blocks 312 and 314, developer image management tool 114 can build the new custom image based on the selected curated base image and selected entries in the curated software lists and can store the custom image in FaaS image repository 106. The custom image can include all of the content of the curated base image, as well as all of the curated software components selected at block 310. Upon storing the custom image, tool 114 can return to block 302 if there are further custom images to be created by the user (block 316) or can terminate the workflow.

5. Uploading Functions

Figure 4:
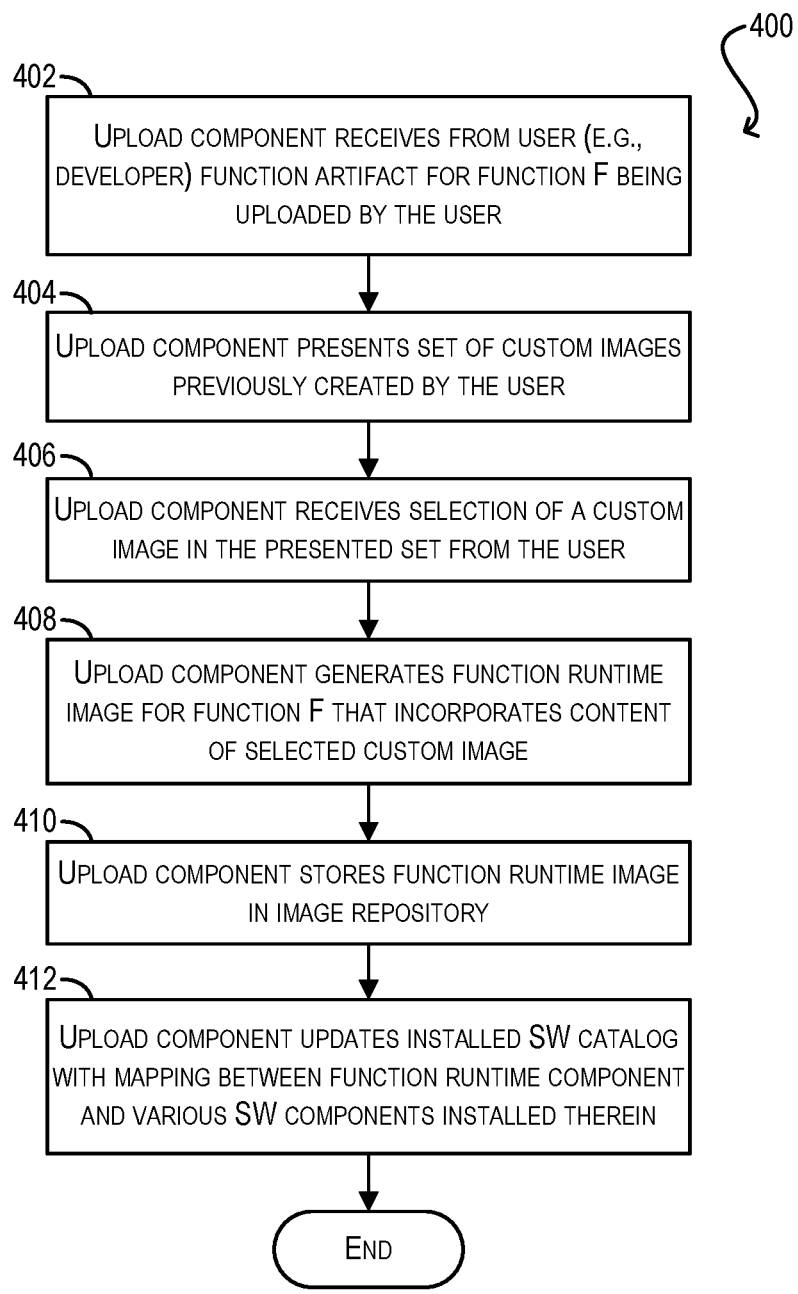
FIG. 4 depicts a function upload workflow according to an embodiment.

FIG. 4 depicts a workflow 400 that may be executed by upload component 108 of FIG. 1 for enabling the upload of a function (in the form of a function artifact) to FaaS infrastructure 100 according to an embodiment. Workflow 400 assumes that one or more custom images have been created using developer image management tool 114 per workflow 300.

Starting with block 402 of workflow 400, upload component 108 can receive from a user (e.g., an application developer) a function artifact for a function F being uploaded by the user. In various embodiments, the function artifact will include program code for function F but will not include any other software such as dependencies needed by F.

At block 404, upload component 108 can present to the user a set of custom images previously created by the user via developer image management tool 114. This set can include all of the custom images created by the user, or a subset that is constrained in some manner (e.g., only those custom images that are associated with the application that function F is a part of, only those custom images that include a language runtime corresponding to the programming language in which function F is written, etc.).

At block 406, upload component 108 can receive a selection of a custom image in the presented set from the user. Generally speaking, the user will select a custom image that includes the dependencies required by the function being uploaded. Upload component 108 can then generate a function runtime image for F that incorporates the content of the selected custom image and the function artifact (block 408) and can store the generated runtime image in FaaS image repository 106 for future scheduling/execution on the hosts of the infrastructure (block 410).

Additionally, at block 412, upload component 108 can update installed software catalog 116 with a mapping between the generated function runtime image and the various software components installed therein (i.e., the curated software components included in the selected custom image). This mapping can include, e.g., the names of the software components, their versions, file listings, and other relevant information. Workflow 400 can subsequently end.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing curated image management in a Functions-as-a-Service (FaaS) infrastructure, the method comprising:

presenting, by a service component of the FaaS infrastructure to an application developer via a first user interface (UI), one or more curated base images defined by one or more administrators of the FaaS infrastructure, each of the one or more curated base images comprising an operating system and a language runtime;

receiving, by the service component from the application developer, a selection of a curated base image from among the one or more curated base images via the first UI;

presenting, by the service component to the application developer via the first UI, one or more curated software lists, the one or more curated software lists identifying curated software components that have been previously:

approved by the one or more administrators for use on the FaaS infrastructure; and associated by the one or more administrators with the selected curated base image;

receiving, by the service component from the application developer, a selection of a curated software component from the one or more curated software lists;

generating by the service component a custom image, the custom image being an executable package of files that incorporates the selected curated software component and the selected curated base image;

subsequently to generating the custom image, receiving, by an upload component of the FaaS infrastructure from the application developer, a function artifact including program code for a function;

in response to receiving the function artifact, presenting, by the upload component to the application developer via a second UI, a set of custom images previously generated by the service component in accordance with selections made by the application developer via the first UI, the set of custom images including the custom image;

receiving, by the upload component from the application developer, a selection of the custom image from among the set of custom images via the second UI, the custom image including software dependencies for the function; and generating, by the upload component, a function runtime image that incorporates the function artifact and the custom image, the function runtime image being useable for running the function on the FaaS infrastructure.

2. The method of claim 1 further comprising:
storing the function runtime image in a repository of the FaaS infrastructure.

3. The method of claim 1 further comprising:
at a time the function invoked, scheduling execution of the function runtime image on a host of the FaaS infrastructure.

4. The method of claim 1 further comprising:
storing a mapping between the function runtime image and the selected curated software component incorporated into the custom image.

5. The method of claim 1 wherein the custom image is a container image or a virtual machine (VM) image.

6. The method of claim 1 wherein the set of custom images presented via the second UI comprise custom images that are associated with an application which the function artifact is a part of.

7. A non-transitory computer readable storage medium having stored thereon program code executable by a computer system in a Functions-as-a-Service (FaaS) infrastructure, the program code embodying a method for implementing curated image management in the FaaS infrastructure, the method comprising:

presenting, to an application developer via a first user interface (UI), one or more curated base images defined by one or more administrators of the FaaS infrastructure, each of the one or more curated base images comprising an operating system and a language runtime;

receiving, from the application developer, a selection of a curated base image from among the one or more curated base images via the first UI;
presenting, to the application developer via the first UI, one or more curated software lists, the one or more curated software lists identifying curated software components that have been previously:
  approved by the one or more administrators for use on the FaaS infrastructure; and
  associated by the one or more administrators with the selected curated base image;
receiving, from the application developer, a selection of a curated software component from the one or more curated software lists;
generating a custom image, the custom image being an executable package of files that incorporates the selected curated software component and the selected curated base image;
subsequently to generating the custom image, receiving, from the application developer, a function artifact including program code for a function;
in response to receiving the function artifact, presenting, to the application developer via a second UI, a set of custom images previously generated in accordance with selections made by the application developer via the first UI, the set of custom images including the custom image;
receiving, from the application developer, a selection of the custom image from among the set of custom images via the second UI, the custom image including software dependencies for the function; and
generating a function runtime image that incorporates the function artifact and the custom image, the function runtime image being useable for running the function on the FaaS infrastructure.

8. The non-transitory computer readable storage medium of claim 7 wherein the method further comprises:
storing the function runtime image in a repository of the FaaS infrastructure.

9. The non-transitory computer readable storage medium of claim 7 wherein the method further comprises:
at a time the function invoked, scheduling execution of the function runtime image on a host of the FaaS infrastructure.

10. The non-transitory computer readable storage medium of claim 7 wherein the method further comprises:
storing a mapping between the function runtime image and the selected curated software component incorporated into the custom image.

11. The non-transitory computer readable storage medium of claim 7 wherein the custom image is a container image or a virtual machine (VM) image.

12. The non-transitory computer readable storage medium of claim 7 wherein the set of custom images presented via the second UI comprise custom images that are associated with an application which the function artifact is a part of.

13. A computer system comprising:
a processor; and
a non-transitory computer readable medium having stored thereon program code that, when executed by the processor, causes the processor to:
  present, to an application developer via a first user interface (UI), one or more curated base images defined by one or more administrators of the FaaS infrastructure, each of the one or more curated base images comprising an operating system and a language runtime;
  receive, from the application developer, a selection of a curated base image from among the one or more curated base images via the first UI;
  present, to the application developer via the first UI, one or more curated software lists, the one or more curated software lists identifying curated software components that have been previously:
    approved by the one or more administrators for use on the FaaS infrastructure; and
    associated by the one or more administrators with the selected curated base image;
  receive, from the application developer, a selection of a curated software component from the one or more curated software lists;
  generate a custom image, the custom image being an executable package of files that incorporates the selected curated software component and the selected curated base image;
  subsequently to generating the custom image, receive, from the application developer, a function artifact including program code for a function;
  in response to receiving the function artifact, present, to the application developer via a second UI, a set of custom images previously generated in accordance with selections made by the application developer via the first UI, the set of custom images including the custom image;
  receive, from the application developer, a selection of the custom image from among the set of custom images via the second UI, the custom image including software dependencies for the function; and
  generate a function runtime image that incorporates the function artifact and the custom image, the function runtime image being useable for running the function on the FaaS infrastructure.

14. The computer system of claim 13 wherein the program code further causes the processor to:
store the function runtime image in a repository of the FaaS infrastructure.

15. The computer system of claim 13 wherein the program code further causes the processor to:
at a time the function invoked, schedule execution of the function runtime image on a host of the FaaS infrastructure.

16. The computer system of claim 13 wherein the program code further causes the processor to:
store a mapping between the function runtime image and the selected curated software component incorporated into the custom image.

17. The computer system of claim 13 wherein the custom image is a container image or a virtual machine (VM) image.

18. The computer system of claim 13 wherein the set of custom images presented via the second UI comprise custom images that are associated with an application which the function artifact is a part of.

* * * * *